(12) United States Patent
Choi et al.

(10) Patent No.: US 6,580,569 B2
(45) Date of Patent: Jun. 17, 2003

(54) OPTICAL PICKUP ASSEMBLY

(75) Inventors: Han-kook Choi, Suwon (KR);
Seok-jung Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 107 days.

(21) Appl. No.: 09/847,602

(22) Filed: May 3, 2001

(65) Prior Publication Data

US 2002/0005995 A1 Jan. 17, 2002

(30) Foreign Application Priority Data

Jun. 30, 2000 (KR) ........................................ 2000-37391

(51) Int. Cl.$^7$ ................................................. G02B 7/02
(52) U.S. Cl. ....................... 359/814; 359/811; 359/813; 359/824; 369/44.14; 369/44.15; 369/112.23
(58) Field of Search ............................... 359/811, 813, 359/814, 823, 824; 369/44.14, 44.15, 44.16, 44.32, 53.19, 112.23, 247, 44.12

(56) References Cited

U.S. PATENT DOCUMENTS 5,220,459 A * 6/1993 Ichikawa et al. ............ 359/811
5,521,762 A * 5/1996 Tomiyama et al. ......... 359/814
5,640,280 A * 6/1997 Lee ............................ 359/824
5,663,840 A * 9/1997 Matsui ........................ 359/814
6,418,094 B1 * 7/2002 Ozawa et al. ............ 369/44.14

* cited by examiner

Primary Examiner—Loha Ben
(74) Attorney, Agent, or Firm—Staas & Halsey LLP

(57) ABSTRACT

An optical pickup assembly is provided having a base; an objective lens including a body portion and a lens portion built into the body portion; a suspension wherein one end is fixed to the body portion and the other end is fixed to a holder supporting the objective lens such that the objective lens is movable; coil members formed at the sides of the body portion of the objective lens; permanent magnets mounted on the base, opposite to the coil members; and yokes for guiding magnetic flux generated by the permanent magnets. In the optical pickup assembly, the objective lens is constructed such that the body portion serving as a bobbin is combined with the lens portion, thereby reducing the weight of the moving part. As a result, the moving part can sensitively accelerate with application of a voltage. In addition, the moment of inertia of the moving part decreases due to the reduced weight thereof, and the secondary resonance frequency of the moving part is increased due to the structure of the objective lens body itself serving as a bobbin. Thus, the optical pickup assembly can efficiently accelerate at a voltage level so that it can be effectively used for high-speed and high-density optical recording/reproduction systems.

22 Claims, 4 Drawing Sheets

OPTICAL PICKUP ASSEMBLY

CROSS REFERENCE TO RELATED APPLICATIONS

This application claims the benefit of Korean Application No. 00-37391, filed Jun. 30, 2000, in the Korean Industrial Property Office, the disclosure of which is incorporated herein by reference.

BACKGROUND OF THE INVENTION

1. Field of the Invention

The present invention relates to an optical pickup assembly having efficient acceleration capability at a voltage level and suitable for high-speed and high-density optical recording/reproduction systems.

2. Description of the Related Art

Optical pickup assemblies are adopted in optical recording/reproduction systems so as to record information on and reproduce information from a recording medium, i.e., an optical disc, seated on a turntable. Here, the optical pickup assemblies move in the radial direction of the optical disc and are not in contact with the optical disc. As shown in FIG. 1, a conventional optical pickup assembly includes an actuator for driving an objective lens 1 in the track and focus directions of an optical disc (not shown) so as to form a light spot on a target track of the optical disc. The actuator includes a base 10, a bobbin 13 on which the objective lens 1 is mounted and which is installed on the base 10 such that it is movable, a suspension 17 in which one end is fixed to the bobbin 13 to support the bobbin 13, such that the bobbin 13 is movable relative to the base 10, and in which the other end is fixed to a holder 15, a focusing coil 21 and a tracking coil 23 wound around the bobbin 13, inner and outer yokes 25 and 27 formed on the base 10, and permanent magnets 29 attached to the inner sides of the outer yokes 27, such that they face the tracking coil 23.

The bobbin 13, which is formed of plastic by molding, supports the objective lens 1. The bobbin 13 acts as a guide in the winding of the focusing coil 21 and the tracking coil 23, and has through holes 13a for receiving the inner yokes 25. The objective lens 1 is seated on the top of the bobbin 13, and the focusing coil 21 and the tracking coil 23 are wound around the sides of the bobbin 13 in a bulk type fashion, such that the objective lens 1 is driven in the focus and track directions of the optical disc as a current applied to the focusing coil 21 and the tracking coil 23 interacts with magnetic flux generated by the permanent magnet 29.

The bobbin 13, the objective lens 1, the focusing coil 21 and the tracking coil 23, which are mounted on the bobbin 13, collectively constitute a moving part of the optical pickup assembly. In the conventional optical pickup assembly having the above configuration, the bobbin 13 accounts for about 50% of the total weight of the moving part. Due to the heavy weight of the moving part, it is difficult for the conventional optical pickup to be driven with high sensitivity.

The "sensitivity" is a measure of the capability of a moving part to accelerate with application of a voltage, and is expressed in units of g/V, where g represents the gravitational acceleration of 9.8 m/s$^2$, and V represents voltage in volts. The acceleration of the moving part including the objective lens required for tracking at a given voltage is determined based on the sensitivity. The degree of sensitivity is proportional to the effective magnetic flux density and the effective coil length, and inversely proportional to the weight of the moving part.

The configuration of the bobbin 13 having the through hole 13a and the weight of the moving part increase moment of inertia, and thus the secondary resonance frequency of the driving part becomes low due to a higher order resonance mode of the bobbin 13 itself. As a result, the frequency bandwidth for servo control is limited. Thus, there is a limitation in improving the sensitivity in driving of the driving part with respect to actuation, so that the conventional optical pickup cannot be applied to a high-speed and high-density optical recording/reproducing system. Furthermore, an additional step of mounting the objective lens 1 on the bobbin 13 is needed, so that a failure occurs due to assembling errors. In addition, the manufacturing cost increases due to increased man-hours for assembling.

SUMMARY OF THE INVENTION

Accordingly, it is an object of the present invention to provide an optical pickup assembly suitable for high-speed and high-density optical recording and reproduction systems, which adopts a lightweight moving part so that it can be efficiently actuated at a voltage level, and in which the secondary resonance frequency of the moving part can be increased.

Additional objects and advantages of the invention will be set forth in part in the description which follows and, in part, will be obvious from the description, or may be learned by practice of the invention.

The foregoing objects of the present invention are achieved by providing an optical pickup assembly comprising: a base; an objective lens including a body portion, and a lens portion built into the body portion; a suspension whose one end is fixed to the body portion and whose other end is fixed to a holder supporting the objective lens such that the objective lens is movable; a coil member formed at the sides of the body portion of the objective lens; permanent magnets mounted on the base, opposite to the coil member; and yokes guiding magnetic flux generated by the permanent magnets.

According to an aspect of the present invention, the objective lens, the suspension and the holder are formed as a single unit by injection molding. The lens portion and the body portion of the objective lens may be formed of the same material.

According to an aspect of the present invention, the coil member includes a focusing coil and a tracking coil, and is patterned as a planar printed circuit board type. Alternatively, the coil member can be directly patterned into the sides of the body portion of the objective lens by etching and/or deposition processes.

It is preferable that the yokes are outer yokes, the permanent magnets are attached to the inner walls of the outer yokes, and the yokes are mounted on the base.

BRIEF DESCRIPTION OF THE DRAWINGS

These and other objects and advantages of the present invention will become apparent and more readily appreciated from the following description of the preferred embodiments, taken in conjunction with the accompanying drawings of which.

DETAILED DESCRIPTION OF THE INVENTION

Figure 1:
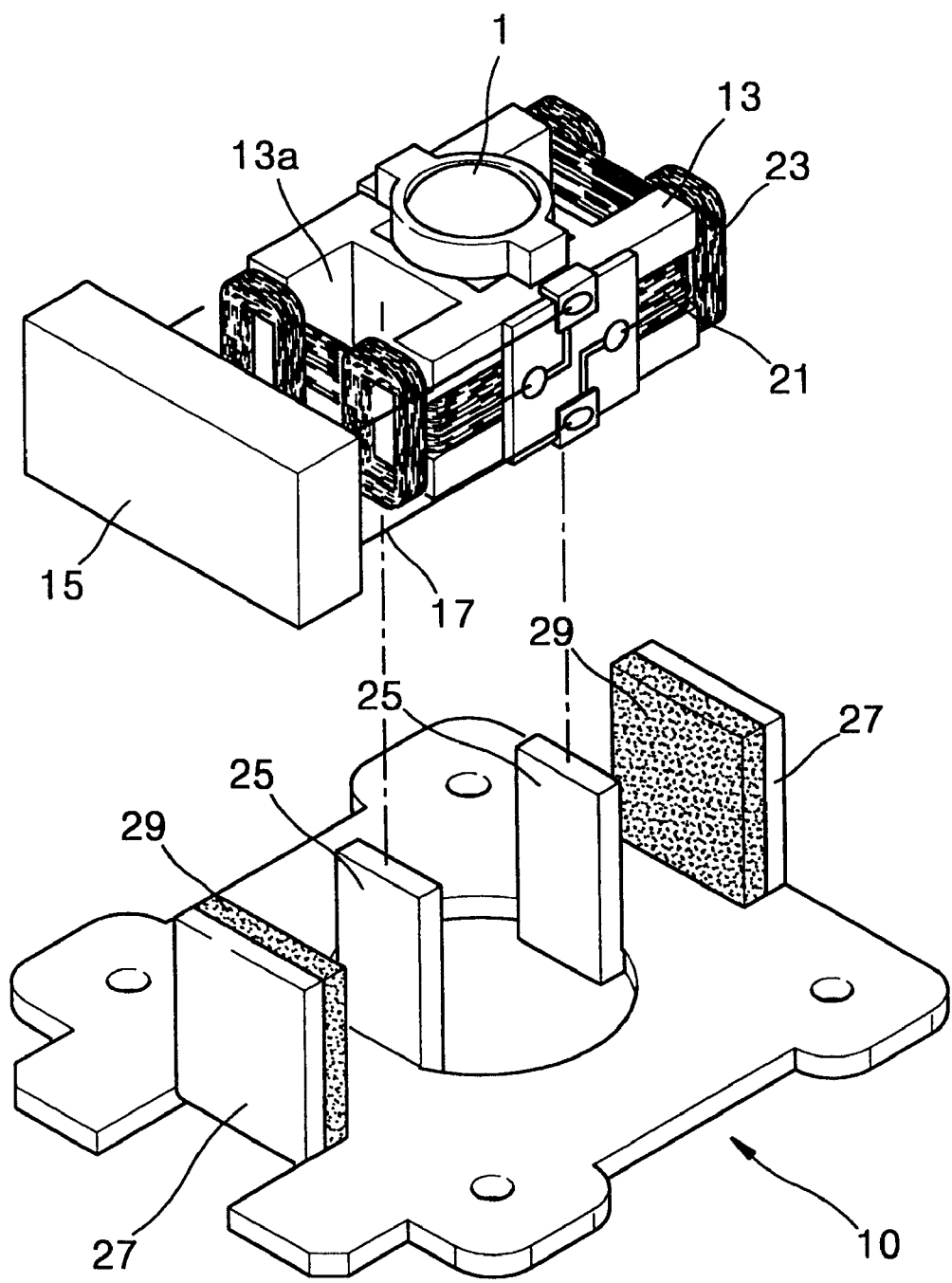
FIG. 1 is a perspective view of a conventional optical pickup assembly.

Reference will now be made in detail to the embodiments of the present invention, examples of which are illustrated in the accompanying drawings, wherein like reference numerals refer to the elements throughout. The embodiments are described below in order to explain the present invention by referring to the figures.

Figure 2:
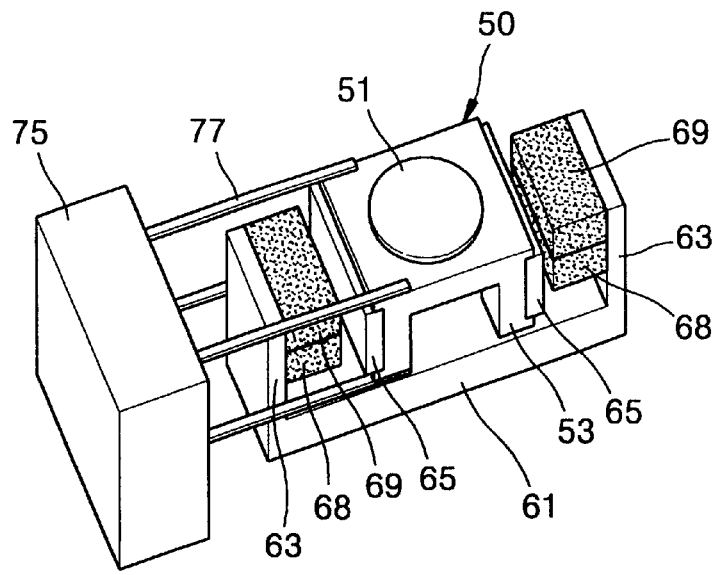
FIG. 2 is a perspective view of an embodiment of an optical pickup assembly according to the present invention.
Figure 3:
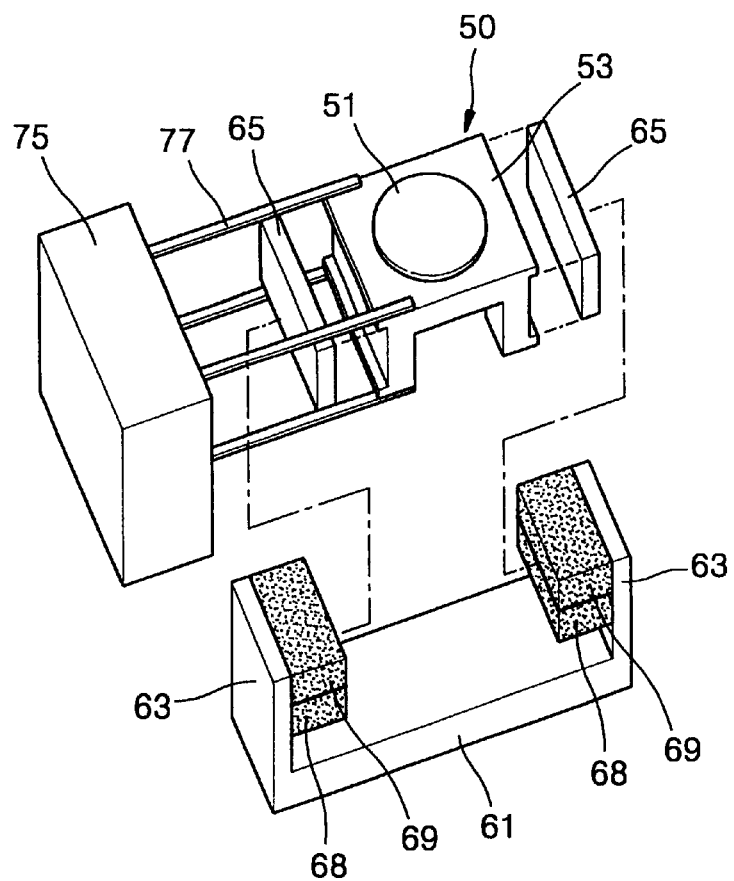
FIG. 3 is an exploded perspective view of the optical pickup assembly of FIG. 2.

Referring to FIGS. 2 and 3, an embodiment of an optical pickup assembly according to the present invention includes a base 61; an objective lens 50 located on the base 61 such that it is movable; a suspension 77 whose one end is fixed to the objective lens 50 and whose other end is fixed to a holder 75; coil members 65 attached at two opposing sides of the objective lens 50; permanent magnets 68 and 69 mounted on the base 61, opposite to the coil members 65; and yokes 63 for guiding magnetic flux generated by the permanent magnets 68 and 69. The objective lens 50 and the coil members 65 collectively constitute a moving part of the optical pickup assembly.

The objective lens 50 includes a body portion 53, and a lens portion 51 built-in to the body portion 53, the lens portion 51 focuses light incident through a predetermined optical system after having been emitted from a light source (not shown). In the body portion 53, a portion of a magnetic circuit driving the objective lens 50 in the focusing and tracking directions of an optical disc (not shown) is installed, and one end of the suspension 77 is fixed to the body portion 53. The body portion 53 serves as the conventional bobbin 13, as shown in FIG. 1. Preferably, the lens portion 51 and the body portion 53 are formed of the same material, for example, a transparent synthetic resin.

As previously mentioned, the objective lens 50 needs no separate bobbin, and is driven by the magnetic circuit including the coil members 65 and the permanent magnets 68 and 69 to form a light spot on a target track of the optical disc. The suspension 77, whose one end is fixed to the body portion 53 and whose other end is fixed to the holder 75, supports the objective lens 50 such that the objective lens 50 is movable. The holder 75 is fixed to the base 61, or to a chassis (not shown) on which the base 61 is mounted. The objective lens 50, the suspension 77 and the holder 75 may be formed as a single unit by injection molding.

In the inventive optical pickup assembly, since the objective lens 50, the suspension 77, and the holder 75 are formed as a single unit, there is no need for a separate bobbin, and it is unnecessary to mount the objective lens 50 on a bobbin, thereby simplifying the assembling process. In addition, failures due to assembling errors are decreased.

Figure 4:
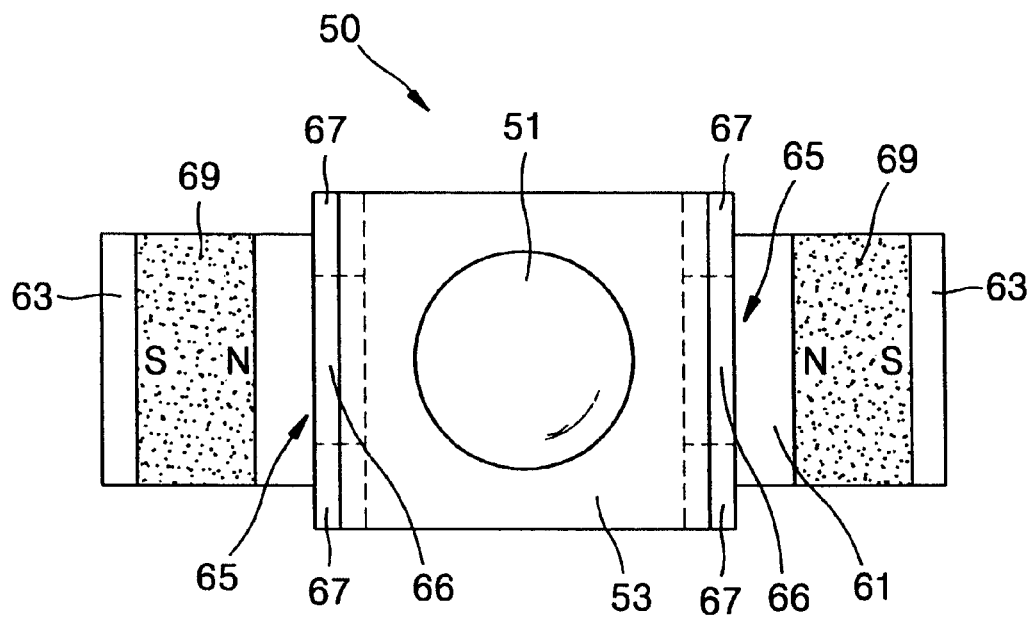
FIG. 4 is a plan view of the major portions from FIG. 2.
Figure 5:
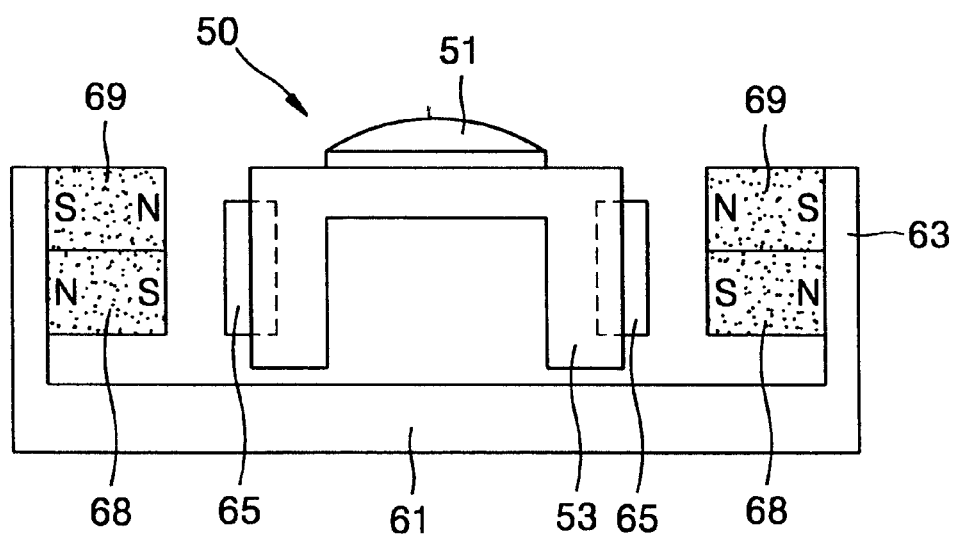
FIG. 5 is a front view of the major portions from FIG. 2.

FIGS. 4 and 5 are plan and front views of the major portions of the optical pickup assembly shown in FIG. 2. As provided in FIGS. 4 and 5, the permanent magnet 68 is arranged such that its S pole faces each coil member 65, whereas the permanent magnet 69 is arranged adjacent to the permanent magnet 68 such that its N pole faces each coil member 65.

Referring to FIGS. 2 through 4, the coil members 65 include the focusing coil 66 and tracking coils 67, which are arranged opposite to the permanent magnets 68 and 69, such that the objective lens 50 is driven in the focus and track directions of the optical disc by electromagnetic interaction between current applied to the coil members 65 and magnetic flux generated by the permanent magnets 68 and 69. As shown in FIGS. 4 and 5, the coil members 65 may be planar, which contributes to reducing the weight of the moving part. Preferably, the body portion 53 has recessions at both sides thereof, which the coil members 65 are attached to.

For example, each of the coil members 65 may be formed as at least one printed circuit board (PCB) in which the focusing coil 66 and the tracking coils 67 of each coil member 65 are formed as patterns. Alternatively, the coil members 65 can be constructed by directly forming the focusing coil 66 and the tracking coils 67 as at least a single layer at both sides of the body portion 53, the focusing coil 66 and the tracking coils 67 having coil patterns formed by etching and subsequent processes, as shown in FIG. 6.

Figure 6:
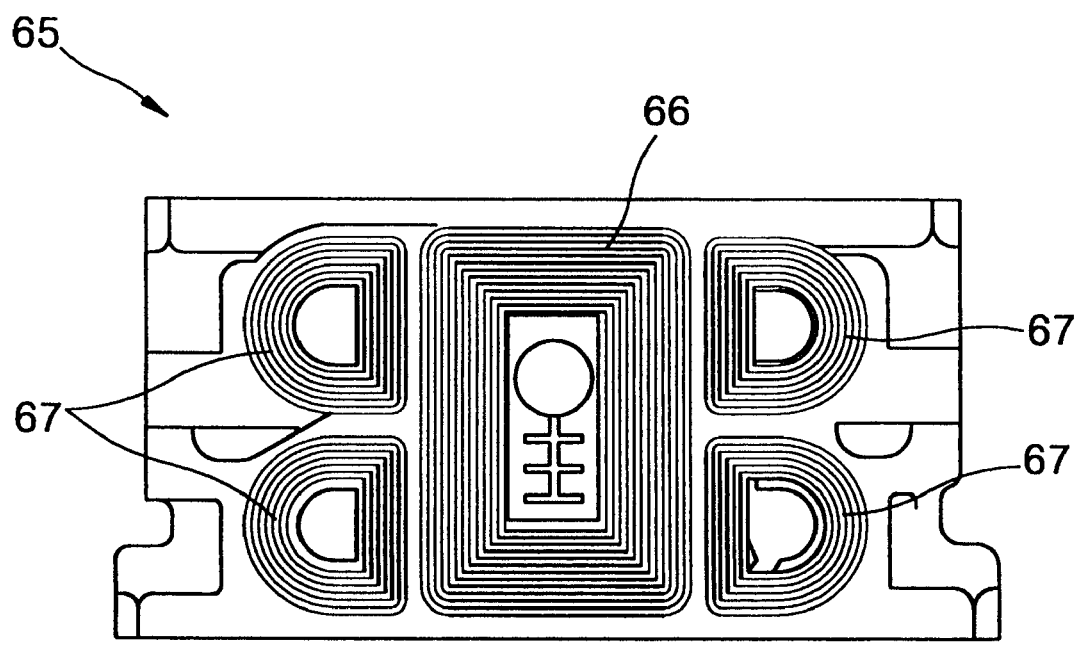
FIG. 6 illustrates an example of the coil member, illustrating the arrangement of the focusing coil and tracking coil of the coil member according to the present invention.

The focusing coil 66 and the tracking coils 67 may be arranged as shown in FIG. 6, such that the moving part is driven in the focusing and tracking directions of the optical disc by interaction between current applied to each coil member 65 and magnetic flux generated by the permanent magnets 68 and 69, which are located adjacent to each coil member 65, as shown in FIG. 5.

Referring to FIG. 6, the focusing coil 66 is arranged at the center of each coil member 65, and four tracking coils 67 are symmetrically arranged on the left and right of the focusing coil 66 (two on each side of the focusing coil 66). The pattern of each tracking coil 67 may include a linear part and a semi-elliptical part, as shown in FIG. 6, which maximizes the effective coil length associated with the activation of the moving part in the tracking direction by the interaction with the permanent magnets 68 and 69. In FIG. 6, the boldfaced pattern of the focusing coil 66 and each tracking coil 67 indicate the effective coil part, which affects the driving of the moving part in the focusing and tracking directions of the optical disc. The coil members 65 having the above configuration contributes to reducing the weight of the moving part.

The coil members 65 and the permanent magnets 68 and 69, which are arranged as previously described, constitute magnetic circuits, and the objective lens 50 is driven in the focusing and tracking directions by interaction between current flowing along the focusing coil 66 and each tracking coil 67, and magnetic flux generated by the permanent magnets 68 and 69.

In particular, a part of the magnetic circuit associated with the relative location and the direction of the N and S poles of the the permanent magnets 68 and 69 is arranged such that magnetic flux generated by the permanent magnets 68 and 69 is perpendicular to the direction of current flow along each focusing coil 66, thereby generating a force driving the objective lens 50 in the focusing direction of the optical disc according to Fleming's left-hand rule. In a similar way, a part of the magnetic circuits associated with the relative location and the direction of the N and S poles of the permanent magnets 68 and 69 is arranged such that magnetic flux generated by the permanent magnets 68 and 69 is perpendicular to the direction of current flow along the tracking coils 67, thereby generating a force driving the objective lens 50 in the tracking direction of the optical disc according to Fleming's left-hand rule.

The yokes 63 for guiding magnetic flux generated by the permanent magnets 68 and 69 are provided on the base 61.

The yokes 63 have a shape exclusive of the inner yokes 25 of the conventional optical pickup assembly shown in FIG. 1, which enables the body portion 53 not to have the through hole 13a for receiving the inner yokes 25, thereby increasing the secondary resonance frequency band of the moving part. In other words, the yokes 63 correspond to outer yokes of which the permanent magnets 68 and 69 are attached to their inner sides. Preferably, the yokes 63 are built into the base 61 using the same material. In this case, the yokes 63 and the base 61 form a yoke plate in the shape of a single bracket "[".

The manufacture of the optical pickup assembly according to the present invention, having the above configuration, is simple, and may be performed as follows. First, the objective lens 50, the suspension 77, and the holder 75 may be simultaneously formed by injection molding. Next, the coil members 65, which may be a planar PCB type as shown in FIG. 6, are attached to two opposing sides of the body portion 53 of the objective lens 50. Alternatively, the coil members 65 can be directly integrated on these opposing sides of the body portion 53 by etching and/or deposition processes.

Following this, the permanent magnets 68 and 69 may be attached to the inner sides of the yokes 63. Then, the holder 75, which is combined with the objective lens 50 and the suspension 77, may be coupled with the base 61 or a chassis (not shown), on which the base 61 is mounted, such that each coil member 65 faces their opposing permanent magnets 68 and 69. As a result, the optical pickup assembly according to the present invention is completed.

In the optical pickup assembly according to the present invention, unlike the conventional optical pickup assembly including a separate bobbin, the objective lens is constructed such that the body portion serving as a bobbin is combined with the lens portion for focusing incident light, thereby reducing the weight of the moving part. As a result, the moving part can sensitively accelerate with the application of a voltage. In addition, the moment of inertia of the moving part decreases due to the reduced weight thereof, and the secondary resonance frequency of the moving part is increased due to the structure of the objective lens, whose body itself serves as a bobbin. Thus, the optical pickup assembly according to the present invention can efficiently accelerate at a voltage level, so that it can be effectively used for high-speed and high-density optical recording/reproduction systems.

In addition, the objective lens provided in the inventive optical pickup assembly is built into the body portion serving as a bobbin, so that there is no need for the step of mounting an objective lens on a separate bobbin. Furthermore, the objective lens, the suspension, and the holder are manufactured as a single unit by injection molding, and therefore failures in reading information on and reproducing information from an optical disc, due to assembling errors, can be prevented, and the man-hours required for the assembling process sharply decreases.

Although a few preferred embodiments of the present invention have been described with reference to the preferred examples, the foregoing disclosure should be interpreted as illustrative only and it should be understood that various modifications and variations can be easily made by those skilled in the art without departing from the spirit of the invention. Accordingly, a true scope and spirit of the invention should be defined by the following claims.

What is claimed is:

1. An optical pickup assembly comprising:
   a base;
   an objective lens including a body portion, and a lens portion built into the body portion,
   a suspension having one end fixed to the body portion and the other end fixed to a holder supporting the objective lens such that the objective lens is movable;
   coil members formed at opposite sides of the body portion of the objective lens;
   permanent magnets mounted on the base facing opposite the coil members, respectively; and
   yokes guiding magnetic flux generated by the permanent magnets.

2. The optical pickup assembly of claim 1, wherein the objective lens, the suspension and the holder are formed as a single unit.

3. The optical pickup assembly of claim 2, wherein the lens portion and the body portion of the objective lens are formed of the same material.

4. The optical pickup assembly of claim 3, wherein the objective lens is formed of a transparent synthetic resin.

5. The optical pickup assembly of claim 2, wherein the single unit is formed by injection molding.

6. The optical pickup assembly of claim 1, wherein the lens portion and the body portion of the objective lens are formed of the same material.

7. The optical pickup assembly of claim 6, wherein the objective lens is formed of a transparent synthetic resin.

8. The optical pickup assembly of claim 1, wherein each of the coil members includes a focusing coil and tracking coils, and is patterned as a planar printed circuit board.

9. The optical pickup assembly of claim 1, wherein each of the coil members includes a focusing coil and tracking coils, and is directly patterned into one of the sides of the body portion of the objective lens by etching and/or deposition processes.

10. The optical pickup assembly of claim 1, wherein the yokes are outer yokes, the permanent magnets are attached to respective inner walls of the outer yokes, and the yokes are mounted on the base.

11. The optical pickup assembly of claim 10, wherein at least two permanent magnets are arranged adjacent to each other on each yoke.

12. An optical pickup assembly comprising:
   a bobbin including an objective lens built therein as a single piece; and
   a base including yokes and permanent magnets guiding movement of the bobbin.

13. The optical pickup assembly according to claim 12, wherein the bobbin and objective lens are formed as a single unit by injection molding.

14. The optical pickup assembly according to claim 12, further comprising coil members positioned on two opposite sides of the bobbin such that the yokes are positioned at outer surfaces of the coil members, respectively.

15. The optical pickup assembly according to claim 14, wherein the coil members are formed into the bobbin by etching and/or deposition processes.

16. The optical pickup assembly according to claim 14, wherein each of the coil members includes a focusing coil; first and second tracking coils positioned at a first side of the focusing coil; and third and fourth tracking coils positioned at a second side of the focusing coil opposite the first side.

17. The optical pickup assembly according to claim 16, wherein the tracking coils and the focusing coils of each coil member are provided in one plane.

18. The optical pickup assembly according to claim 17, wherein the focusing coils and the tracking coils are patterned.

19. The optical pickup assembly according to claim 18, wherein each of the tracking coils further includes a linear part and a semi-elliptical part such that the linear part is positioned adjacent to the focusing coil.

20. The optical pickup assembly according to claim 12, wherein the bobbin has a recession at a first side thereof and another recession at a second side thereof opposite to the first side.

21. The optical pickup assembly according to claim 12, wherein the magnets comprise a pair of magnets positioned at each yoke such that ones of each pair of magnets are adjacent each other with their magnetic poles opposite each other.

22. An optical pickup assembly comprising:
- a bobbin including an objective lens built therein as a single piece;
- a base supporting the bobbin;
- a suspension connecting the bobbin to the base; and
- a drive unit between the bobbin and the base driving the optical pickup assembly.

* * * * *